Figure 1:
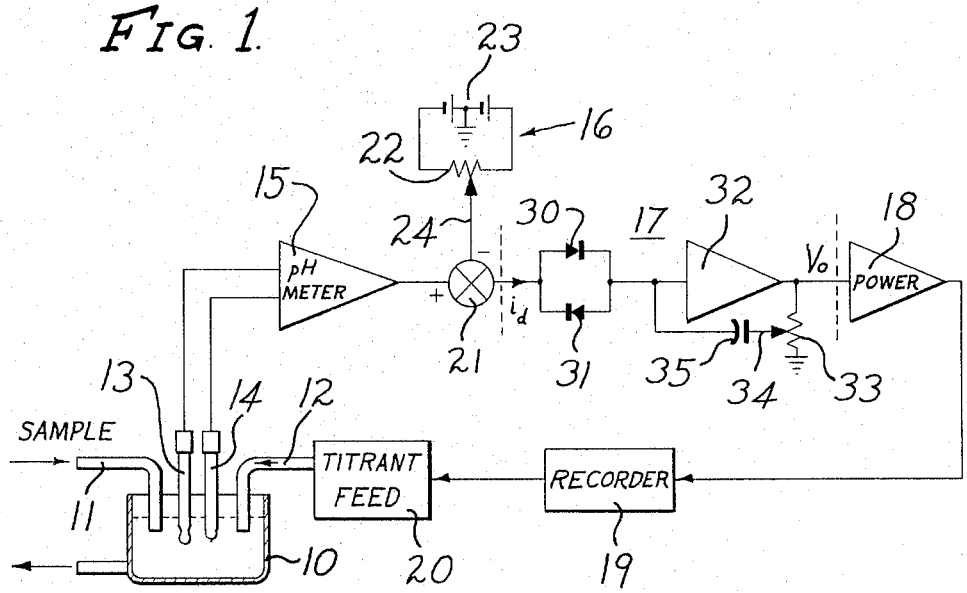

Sept. 27, 1966  A. D. BORONKAY  3,275,533

METHOD AND APPARATUS FOR AUTOMATIC TITRATION

Filed Nov. 19, 1962

INVENTOR.

ATTILA D. BORONKAY

BY HIS ATTORNEYS

HARRIS, KIECH RUSSELL & KERN

3,275,533
METHOD AND APPARATUS FOR AUTOMATIC TITRATION
Attila D. Boronkay, Fullerton, Calif., assignor to Beckman Instruments, Inc., a corporation of California
Filed Nov. 19, 1962, Ser. No. 238,585
9 Claims. (Cl. 204—1)

This invention relates to automatic titration and, in particular, to new and improved methods and apparatus for continuously titrating sample streams.

An automatic titrator is designed to maintain the sample-titrant mixture at the end point of the titration as the condition of the sample varies by varying the quantity or condition of the titrant. A number of continuous and automatic titrating systems have been proposed but exhibit various disadvantages such as slow response, unstable operation, and limited operating range.

An automatic titrator normally includes means for supplying a titrant, means for mixing the titrant and sample, a device for sensing the condition of the mixture, and a control circuit for supplying titrant as a function of the condition of the mixture. Various forms of titrators are shown in U.S. Patent Nos. 2,621,671; 2,745,804; 2,758,079; and 2,832,734 and in application for U.S. patent Serial No. 157,130, filed December 5, 1961, and assigned to the same assignee as the present application.

It is an object of the present invention to provide a new and improved control circuit for use in automatic titrators. A further object is to provide such a control circuit for continuous titration and having a rapid and highly stable response and being operable over a wide range of error signals. A particular object is to provide such a control circuit permitting automatic titration of strong acids and strong bases as well as weak acids and weak bases.

It is another object of the invention to provide a titrator for automatic control of titration rate and including titrant feed means for delivering titrant to a sample at a variable rate, electrode means for generating an output signal varying as a function of sample-titrant mixture condition, an exponential integrator circuit with the output signal connected as an input thereto, and amplifier means for controlling the feed means with the output of the integrator circuit connected as an input thereto. Another object is to provide such an instrument in which the exponential integrator circuit includes a high gain amplifier, a negative feedback connection across the amplifier and including a series capacitor, and a pair of rectifier elements connected in parallel and in opposing polarity between the output signal and the input to the amplifier. A particular object of the invention is to provide a titrator control circuit incorporating the exponential integrator circuit which is suitable for use in various known automatic titrators. A further object of the invention is to provide such a control circuit that is particularly adapted for use with titrations where the equilibrium is detected by a pH meter.

It is an object of the invention to provide a method of continuous titration including the steps of supplying a titration reagent, mixing the reagent with a sample stream to form a sample-reagent mixture, sensing the condition of the mixture, generating an electrical signal indicative of the condition, converting the electrical signal into a control signal having an exponential integral relationship, and utilizing the control signal to control the supply of titrant reagent to the mixture.

Figure 2:
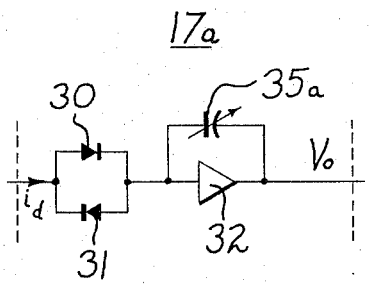

The invention also comprises novel details of construction and novel combinations and arrangements of parts, which will more fully appear in the course of the following description. The drawing shows and the description describes preferred embodiments of the present invention which are given by way of illustration or example. FIG. 1 is a schematic diagram of a preferred circuit arrangement and FIG. 2 is a schematic diagram of an alternative form of the control circuit of FIG. 1.

The embodiment illustrated in FIG. 1 includes a container 10 defining a zone in which sample fed in through line 11 and titrant fed in through line 12 are mixed, a sensing electrode 13, a reference electrode 14, a pH meter 15, a reference voltage source 16, a control circuit 17, a power amplifier 18, a recorder 19, and a titrant feed unit 20.

A stirrer or other suitable means (not shown) may be used to provide improved mixing of the sample and titrant in the mixing zone. The electrodes and pH meter may be conventional instruments which provide an output signal at the mixing point 21 corresponding to the pH of the mixture in the container 10.

The reference voltage source 16 includes a potentiometer 22 connected across a D.C. supply 23, with the arm 24 of the potentiometer being adjustable to provide a variable reference voltage at the mixing point 21 corresponding to the desired end point of the titration. The difference between the output signal from the pH meter 15 and the reference voltage from the source 16 serves as the input to the control circuit 17. The output from the control circuit may be amplified at 18, recorded at 19, and used to drive the titrant feed 20. Various conventional titrant feed systems may be utilized. The volume of titrant flowing through the line 12 may be varied or may remain constant and the makeup of the titrant may be varied. References in the specification and claims to controlling the rate of flow of titrant are intended to include both methods. The titrant feed unit may comprise, for example, a pump operated at a variable rate, a valve mechanism for throttling flow through the line 12 at a controlled variable rate, or a coulemetric reagent generator. A typical reagent generator is shown in the aforesaid copending application of Strickler, Serial No. 157,130, filed December 5, 1961.

In the operation of automatic continuous titrators for monitoring process streams and the like, serious problems have been encountered in maintaining stability and achieving rapid response to changes in sample condition. It has been found that the introduction of a control circuit of a particular characteristic into the instrument for controlling the titrant feed rate provides a simple and reliable solution to these problems.

The new control circuit of the present invention is an exponential integrator with the output thereof varying as an exponential integral of the input thereto. The transfer function of the control circuit 17 is $$\frac{V_o}{i_d} = \frac{1}{\beta C s}$$

where $V_o$ is the output voltage, $i_d$ the input current, $\beta$ the feedback factor, $C$ the feedback capacitance, and $s$ the complex variable.

A suitable circuit for producing this characteristic is shown in the drawing. A pair of rectifier elements 30, 31, typically solid state diodes such as 1N457, are connected in parallel and in opposing polarity. This parallel rectifier circuit is connected between the point 21 and an amplifier 32. The amplifier 32 is referred to as an operational amplifier and has very high gain, typically in excess of $10^5$. The output of the amplifier 32 is developed across a potentiometer 33, with the movable arm 34 providing a variable feedback factor, with the feedback connection through a capacitor 35 to the input of the amplifier 32.

An alternative form for the control circuit 17 is shown in FIG. 2, wherein elements corresponding to those of FIG. 1 are identified by the same reference numerals. A variable capacitor 35a is substituted for the capacitor 35 and potentiometer 33. Actually, if all of the parameters of a system were known and the instrument was intended for only one type of measurement, a fixed value capacitor could be used in the arrangement of FIG. 2 or a pair of fixed resistors could be substituted for the potentiometer of FIG. 1. However, some adjustment of characteristics is usually desired in instrumentation equipment and hence either the potentiometer version or the variable capacitor version will normally be used.

The control circuit described herein provides a linear relation between the rate of change of sample condition and titrant condition at the mixing zone, which linear relationship is ideal for the automatic and continuous maintenance of the desired titration end point.

Automatic titrators incorporating the features of the present invention have a response time to step function changes in concentration in the order of one-half to one minute as compared to four minutes and greater for previously known instruments. Also the automatic titrator described herein may be used for samples with various concentrations without requiring adjustment as it is a self-adaptive instrument.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a titrator for continuously titrating a sample stream and including means for mixing the sample and titrant in a mixing zone and means for generating an electrical output signal varying as a function of the ion concentration of the mixture, the combination of:
    a reference voltage source for providing a reference signal;
    means for combining said reference signal and said output signal to produce an error signal which varies as a function of the deviation of the ion concentration of the mixture from a desired condition;
    means for controlling flow of titrant to the mixing zone in response to a titrant rate signal; and
    a control circuit for generating said titrant rate signal and having said error signal as an input, with the output of said control circuit varying as a time integral of the exponential of the input thereto.

2. In a titrator for continuously titrating a sample stream and including means for controlling the rate of flow of titrant to the sample-titrant mixing zone as a function of an error signal indicating deviation of the ion concentration of the mixture from the desired concentration, the improvement comprising a control circuit for coupling the error signal to the titrant flow control means in driving relation, the control circuit having as a transfer function $$\frac{V_o}{i_d} = \frac{1}{\beta C s}$$

where $V_o$ is the output voltage, $i_d$ the input current, $\beta$ the feedback factor, $C$ the feedback capacitance, and $s$ the complex variable.

3. In a titrator for automatic control of titration and including titrant feed means for delivering titrant to a sample at a variable rate, and electrode means for generating an output signal varying as a function of sample-titrant mixture ion concentration, the combination of:
    circuit means for electrically first deriving an exponential function and then integrating, with said output signal connected as an input thereto; and
    amplifier means for controlling said feed means, with the output of said circuit connected as an input thereto.

4. A titrator as defined in claim 3 in which said circuit comprises:
    a high gain amplifier;
    a negative feedback connection across said amplifier, said feedback connection including a series capacitor; and
    a pair of rectifier elements connected in parallel and in opposing polarity, with said elements connected between said output signal and the input to said amplifier.

5. In a continuous titrator, the combination of:
    means for supplying a flow of a sample solution to be titrated;
    means for supplying a flow of titrant;
    means for mixing said sample and said titrant to form a reaction product;
    means for sensing the ion concentration of said product; and
    control means electrically coupled between said sensing means and said titrant supply means, said control means having a transfer function with an integral and an exponential gain factor.

6. In a titrator for continuously titrating a sample stream, the combination of:
    means for supplying a titrant;
    means for mixing the sample and titrant in a mixing zone;
    electrode means for measuring the pH of the mixture;
    means for generating an error signal as a function of the difference between the measured pH and the titration end point; and
    means for controlling said titrant supply means and having said error signal as an input thereto to change said error signal toward a minimum, said control means output varying as an integral of the exponential of the input.

7. In a titrator for continuously titrating a sample stream, the combination of:
    means for supplying a titrant;
    means for mixing the sample and titrant in a mixing zone;
    electrode means for measuring the pH of the mixture;
    means for generating an error signal as a function of the difference between the measured pH and the titration end point; and
    means for controlling said titrant supply means and having said error signal as an input thereto to change said error signal toward a minimum, said control means including a pair of solid state diodes connected in parallel and in opposing polarity, a high gain amplifier, and a negative feedback connection across said amplifier, said feedback connection including a series capacitor, said diode pair being connected between said error signal and the input to said amplifier.

8. A method of continuous titration, including the steps of:
    supplying a titration reagent;
    mixing said reagent with a sample stream to form a sample-reagent mixture;
    sensing the ion concentration of said mixture;
    generating an electrical signal indicative of said concentration;
    converting said signal into a control signal varying as the integral of an exponential thereof; and
    utilizing said control signal to control the supply of titration reagent.

9. A method of automatically varying the rate of flow of titrant in a titration process, including the steps of:
   measuring the pH of a titrant-simple mixture;
   generating an error signal as a function of the difference between measured pH and titration end point;
   generating a control signal which varies as a time integral of the exponential of the error signal; and
   varying the flow of titrant in direct relation to said control signal.

References Cited by the Examiner

UNITED STATES PATENTS 2,758,079  8/1956  Eckfeldt _____ 204—195

JOHN H. MACK, *Primary Examiner.*

MURRAY TILLMAN, T. H. TUNG,
*Assistant Examiners.*